(12) United States Patent
Kawashima (10) Patent No.: US 9,755,527 B2
(45) Date of Patent: Sep. 5, 2017

(54) SWITCHING POWER SUPPLY DEVICE

(71) Applicant: FUJI ELECTRIC CO., LTD., Kawasaki-shi, Kanagawa (JP)

(72) Inventor: Tetsuya Kawashima, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 15/274,641

(22) Filed: Sep. 23, 2016

(65) Prior Publication Data

US 2017/0149339 A1    May 25, 2017

(30) Foreign Application Priority Data

Nov. 19, 2015 (JP) ................................ 2015-226308

(51) Int. Cl.
    *H02M 3/335* (2006.01)
    *H02M 1/08* (2006.01)
    *H02M 1/00* (2006.01)

(52) U.S. Cl.
    CPC ......... *H02M 3/33507* (2013.01); *H02M 1/08* (2013.01); *H02M 2001/0032* (2013.01)

(58) Field of Classification Search
    CPC ............. H02M 3/335; H02M 3/33507; H02M 3/33515; H02M 2001/0003; H02M 2001/0025; H02M 2001/0032
    See application file for complete search history.

(56) References Cited

U.S. PATENT DOCUMENTS 7,456,621 B2 * 11/2008 Leung .................... H02M 1/42
                                                  323/283
9,231,484 B2 *  1/2016 Uno ................. H02M 3/33569

FOREIGN PATENT DOCUMENTS

| JP | 2011-97792  | 5/2011  |
| JP | 2012-235618 | 11/2012 |
| JP | 2013-46423  | 3/2013  |

\* cited by examiner

*Primary Examiner* — Gary L Laxton (57) ABSTRACT

A switching power supply device includes an output voltage detection unit that outputs an output voltage detection value. The control circuit includes: a target voltage generation unit that generates an output voltage setting value; an A/D conversion unit that A/D converts an error between the output voltage setting value and the output voltage detection value; a digital compensation unit that computes an amount of control based on an output signal of the A/D conversion unit; and a PWM signal generation unit that generates a PWM signal for the switching element based on the amount of control. The target voltage generation unit detects a standby state based on the output voltage detection value, the output signals of the A/D conversion unit and the digital compensation unit, and in the standby state, switches the output voltage setting value to a second value lower than a value for another state.

9 Claims, 9 Drawing Sheets

SWITCHING POWER SUPPLY DEVICE

CROSS REFERENCE TO RELATED APPLICATIONS AND INCORPORATION BY REFERENCE

This application claims benefit of priority under 35 USC 119 based on Japanese Patent Application No. 2015-226308 filed on Nov. 19, 2015, the entire contents of which are incorporated by reference herein.

BACKGROUND OF THE INVENTION

The present invention relates to a switching power supply device that reduces an output voltage setting value when a load is in a standby state.

Figure 7:
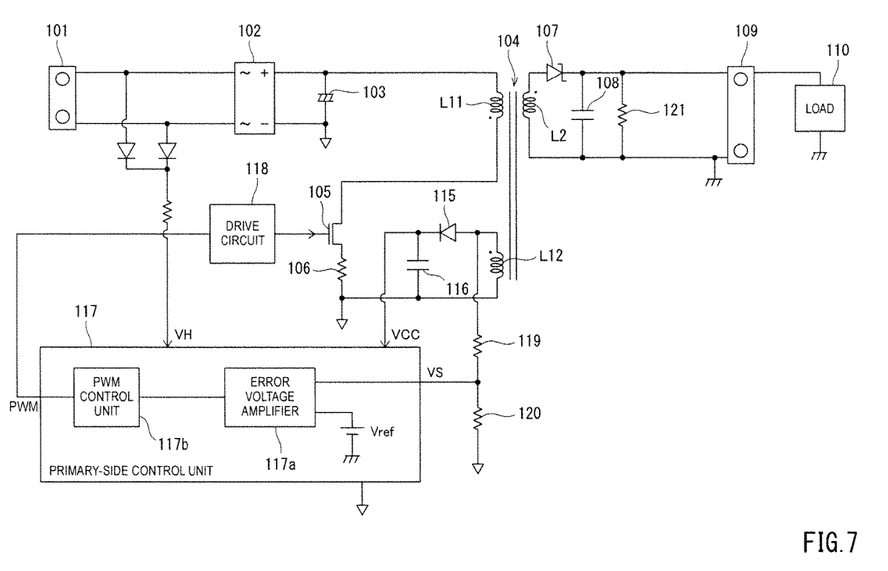
FIG. 7 is a block diagram depicting a conventional switching power supply device.

As this kind of switching power supply device, a switching power supply device of a primary-side control fly back type depicted in FIG. 7 is proposed. The switching power supply device converts single-phase alternating current input to an input terminal 101 into direct current by an AC-DC converting circuit 102, smooths the direct current by a smoothing capacitor 103, and supplies it to a one-end side of a primary winding L11 of a transformer 104. The other-end side of the primary winding L11 is grounded via a switching element 105 and a resistor 106.

An alternating current voltage induced in a secondary winding L2 of the transformer 104 is converted into direct current in a rectifier diode 107, smoothed by an output capacitor 108, and output as an output voltage Vout to an output terminal 109. The output terminal 109 is connected to a load 110.

Additionally, an alternating current voltage corresponding to the secondary winding voltage is induced in an auxiliary winding L12 disposed on the transformer 104. The alternating current voltage is rectified in a rectifier diode 115, smoothed by a smoothing capacitor 116, and supplied to a VCC terminal of a primary-side control unit 117. Furthermore, a voltage across the auxiliary winding L12 is divided in resistors 119 and 120 and supplied to a VS terminal of the primary-side control unit 117.

The primary-side control unit 117 stabilizes the output voltage Vout to a desired output voltage setting value Vref by utilizing the fact that a VS terminal voltage during a period of conduction of the rectifier diode 107 of a secondary side is proportional to the output voltage Vout. Specifically, the primary-side control unit 117 controls a frequency or a duty ratio of a rectangular wave signal PWM output by an error voltage amplifier 117a and a PWM control unit 117b to stabilize the output voltage. The rectangular wave signal PWM is supplied to a drive circuit 118, and the drive circuit 118 performs switching operation of the switching element 105.

The above circuit system is known to be advantageous in that there is no need for an insulation element such as a photocoupler for feedback controlling the output voltage Vout and therefore the number of components can be reduced.

In the circuit system, in order to detect a VS terminal voltage by the primary-side control unit 117, switching operation is regularly performed to conduct the secondary-side rectifier diode 107, thereby monitoring the state of the output voltage Vout. However, while when the switching power supply device is under no load, the output capacitor 108 is charged by the switching operation during the period of conduction of the rectifier diode 107, there is ideally no loss path during a non-conduction period thereof. Due to this, there is a problem in that energy charged in the output capacitor 108 is not discharged and the output voltage Vout continues to increase.

Thus, as depicted in FIG. 7, increase in the output voltage Vout is suppressed by connecting a discharging resistor 121 in parallel to the output capacitor 108. However, a loss ($Vout^2/Rd$) due to a resistance value Rd of the discharging resistor 121 occurs even in standby mode during which no load current flows. Accordingly, from the viewpoint of low standby power, it is desired to maximally increase the resistance value Rd of the discharging resistor 121.

In order to suppress increase in the output voltage Vout even though the resistance value Rd of the discharging resistor 121 is increased, the non-conduction period of the rectifier diode 107 corresponding to a discharging period of the output capacitor 108 needs to be made sufficiently long. In this case, an interval for monitoring the state of the output voltage also becomes long, which causes a problem in that output voltage control is delayed at a time of occurrence of an external disturbance such as input fluctuation or load fluctuation. On the other hand, there is a means for suppressing increase in the output voltage Vout by shortening the conduction period of the rectifier diode 107 by shortening an ON time of the switching element. This means can cause a new problem in that a control terminal voltage of the switching element does not increase up to a threshold value and the switching element is not conducted.

Then, as another means for reducing standby power, a method is employed that reduces the output voltage Vout in standby mode. This means can reduce a loss ($Vout^2/Rd$) of the resistance value Rd of the discharging resistor 121. Furthermore, as depicted in FIG. 7, in the structure in which a power supply voltage Vcc of the primary-side control unit 117 is supplied from the auxiliary winding L12 via the rectifier diode 115, the power supply voltage Vcc is also reduced. Thus, when consumed current of the primary-side control unit 117 is Icc, a loss (Vcc×Icc) of the primary-side control unit 117 can be reduced.

As a conventional technique for reducing the output voltage, for example, a power supply circuit described in JP 2011-97792 A is proposed. In the power supply circuit described in JP 2011-97792 A, output of a secondary rectifier unit connected to a secondary side of a transformer is supplied to a feedback unit, and a switching signal for switching a feedback constant is supplied to the feedback unit from a control unit, thereby changing a resistance value of a voltage dividing resistor of a shunt regulator.

When a load is in an operation state, the power supply circuit controls a voltage that is supplied to the shunt regulator to a low value by using three resistors including two resistors of the secondary rectifier unit side and one resistor of a ground side. On the other hand, when in a standby state or a sleep state, the power supply circuit controls a voltage that is supplied to the shunt regulator to a high value by bypassing one of the resistors of the secondary rectifier unit side. Then, a switching frequency of a switching element connected to a primary-side winding of the transformer is lowered, and an output voltage output from the secondary rectifier unit of the secondary side of the transformer is lowered.

In addition, JP 2012-235618 A discloses a switching power supply circuit provided with two current paths including a first current path and a second current path, used as current paths for generating a feedback signal of a feedback circuit. In the power supply circuit, a P-ON-H signal that is input to the feedback circuit is turned ON at a P-ON time, and a switching element is driven with current of the second current path, without using current of the first current path. At this time, a low level feedback signal is generated. The feedback signal is supplied to a primary-side control circuit via a photocoupler, whereby a secondary-side output voltage of the transformer is controlled at high level. On the other hand, at a standby time, no P-ON-H signal is input, and current is allowed to flow to both of the first and second current paths, thereby driving the switching element with currents of both current paths. At this time, a high level feedback signal is generated and then supplied to the primary-side control circuit via the photocoupler, whereby the secondary-side output voltage of the transformer is switched to a lower voltage.

Furthermore, a switching power supply device described in JP 2013-46423 A detects a duty of a pulse voltage that occurs on a secondary winding of a transformer by a duty detecting circuit. The power supply device changes a feedback signal that is supplied to a primary-side control circuit via a photocoupler when the duty of a pulse signal becomes below a previously determined duty, thereby reducing a secondary-side output voltage of the transformer.

SUMMARY OF THE INVENTION

In the switching power supply devices described in the patent literatures described above, the feedback signal generated by detecting the secondary-side output voltage of the transformer is supplied to the control circuit connected to the primary side of the transformer via the photocoupler. In other words, this kind of power supply device has a problem in that an insulation element such as a photocoupler is needed to provide insulation between the primary side and the secondary side.

Accordingly, the present invention has been made by focusing on the problem of the conventional examples, and it is an object of the invention to provide a switching power supply device that can switch an output voltage when the operation state of a load is a standby state, without using any insulation element.

In order to achieve the object mentioned above, according to an aspect of the present invention, there is provided a switching power supply device including a switching element connected to a primary winding of a transformer to which direct current power is supplied, a control circuit that performs switching-control of the switching element, a load that is connected to a secondary side of the transformer and to which an output voltage is supplied via a rectifier circuit, and an output voltage detection unit that detects the output voltage and outputs an output voltage detection value. The control circuit includes: a target voltage generation unit that generates an output voltage setting value for setting the output voltage that is supplied to the load; an A/D conversion unit that converts an error between the output voltage setting value and the output voltage detection value into a digital signal and outputs the digital signal; a digital compensation unit that computes an amount of control based on the output signal of the A/D conversion unit; and a PWM signal generation unit that generates a PWM signal for the switching element based on an output signal of the digital compensation unit and outputs the PWM signal. The target voltage generation unit detects a standby state based on the output voltage detection value, an output signal of the A/D conversion unit, and an output signal of the digital compensation unit, and, when detecting the standby state, switches the output voltage setting value to a second setting voltage value lower than a first setting voltage value for a state other than the standby state.

According to one aspect of the invention, a standby state of the load can be detected from an output voltage detection value, an output signal of the A/D conversion unit, and an output signal of the digital compensation unit, and switching control of an secondary-side output voltage of the transformer can be performed without providing any feedback signal system using an insulation element.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Next, some embodiments of the present invention will be described with reference to the drawings. In the following descriptions of the drawings, the same or similar parts are denoted by the same or similar reference signs.

In addition, the following embodiments exemplify devices and methods for embodying the technical idea of the present invention, and the technical idea thereof does not limit the materials, shapes, structures, arrangements, and the like of constituent components to those described below. The technical ideas of the invention can be modified in various manners within the technical scope defined by the claims set forth in CLAIMS.

Hereinafter, a switching power supply device according to a first embodiment of the present invention will be described with reference to the drawings.

Figure 1:
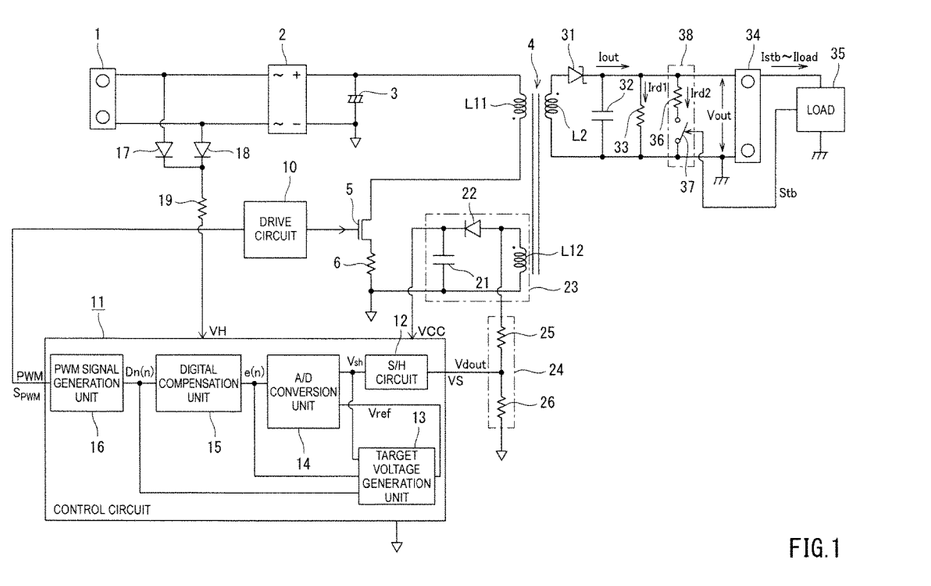
FIG. 1 is a block diagram depicting a first embodiment of a switching power supply device according to the present invention.

The entire structure of the switching power supply device includes an alternating current input terminal 1 connected to an external alternating current power supply, and the alternating current input terminal 1 is connected to an AC-DC converting circuit 2 that converts alternating current power to direct current power, as depicted in FIG. 1. A smoothing capacitor 3 is connected between a positive output terminal and a negative output terminal of the AC-DC converting circuit 2. A positive side of the smoothing capacitor 3 is connected to one end of a primary winding L11 of a fly-back transformer 4. The other end of the primary winding L11 is connected to a source of a switching element 5 formed by, for example, a p-channel junction type FET (Field-Effect Transistor). A drain of the switching element 5 is grounded via a resistor 6.

A gate of the switching element 5 is connected to a drive circuit 10, and the drive circuit 10 is connected to a PWM terminal of a control circuit 11. The drive circuit 10 outputs a gate signal for performing switching operation of the switching element 5 by a PWM signal $S_{PWM}$ output from the PWM terminal of the control circuit 11.

The control circuit 11 is formed by an integrated circuit and includes, in addition to the PWM terminal, a VH terminal, a VCC terminal for generating internal power supply, a VS terminal for detecting an output voltage, a GND terminal and the like.

The VH terminal of the control circuit 11 is connected between the alternating current input terminal 1 and the AC-DC converting circuit 2 via rectifier diodes 17 and 18 and a current limiting resistor 19.

The VCC terminal of the control circuit 11 is connected to a positive terminal of a capacitor 21 and a cathode terminal of a diode 22, and a negative terminal of the capacitor 21 is grounded. An anode terminal of the diode 22 is connected to one end of an auxiliary winding L12 of a transformer 4, and the other end of the auxiliary winding L12 is grounded. The capacitor 21, the diode 22, and the auxiliary winding L12 form a power supply circuit 23 of the control circuit 11 that converts an alternating current voltage induced in the auxiliary winding L12 into a direct current power supply voltage.

The VS terminal of the control circuit 11 is connected to an output voltage detection unit 24 to which an inter-terminal voltage of the auxiliary winding L12 is input, so as to receive a signal corresponding to an output voltage Vout of a secondary side of the transformer 4. The output voltage detection unit 24 includes voltage dividing resistors 25 and 26 connected in series between one end of the auxiliary winding L12 and ground, and an output voltage detection value Vdout of an intermediate connection point between the voltage dividing resistors 25 and 26 is input to the VS terminal of the control circuit 11.

The transformer 4 includes a secondary winding L2 whose one end is connected to an anode terminal of a rectifier diode 31. A cathode terminal of the rectifier diode 31 is connected to a positive terminal of a smoothing capacitor 32, and a negative terminal of the smoothing capacitor 32 is connected to the other end of the secondary winding L2 and grounded. The secondary winding L2, the rectifier diode 31, and the smoothing capacitor 32 form a circuit that converts an alternating current voltage induced in the secondary winding L2 into a direct current voltage, and form an output circuit of the switching power supply device. The positive terminal of the smoothing capacitor 32 is connected to a load 35 via an output terminal 34.

In addition, a discharging resistor 33 is connected in parallel to the smoothing capacitor 32, and an in-operation discharging circuit 38 including a standby state detection resistor 36 and a switch 37 connected in series is connected in parallel to the discharging resistor 33. The switch 37 is controlled to an ON state in an operation state and to an OFF state in a standby state by a load state signal Stb output from the load 35. Herein, an output current Iout when the switch 37 is turned OFF is an added value of a current Ird1 flowing through the resistor 33 and a standby current Istb of the load 35 (Iout=Ird1+Istb). As will be described later, a digital output Dn(n) of a digital compensation unit 15 is lowered to equal to or less than a third threshold value Dn_stb1 as a standby determination value. In order to prevent an erroneous operation in the determination, it is preferable that Ird1 is much smaller than (Ird1+Ird2) (Ird1<<(Ird1+Ird2)), and, desirably, a resistance value Rd2 of the resistor 36 of the in-operation discharging circuit 38 is assumed to be a resistance value lower by one or more digits than a resistance value Rd1 of the discharging resistor 33.

Next, a specific structure of the control circuit 11 will be described. The control circuit 11 includes a sample hold (S/H) circuit 12, a target voltage generation unit 13, an A/D conversion unit 14, the digital compensation unit 15, and a PWM signal generation unit 16.

The sample hold circuit 12 samples and holds the output voltage detection value Vdout input from the VS terminal at a predetermined cycle, and outputs a held sample hold voltage Vsh to the A/D conversion unit 14.

The target voltage generation unit 13 sets a target value of the output voltage Vdout output from the secondary side of the transformer 4. The sample hold voltage Vsh output from the sample hold circuit 12, an error voltage e(n) output from the A/D conversion unit 14, the digital output Dn(n) output from the digital compensation unit 15, and the PWM signal $S_{PWM}$ output from the PWM signal generation unit 16 are input to the target voltage generation unit 13. On the basis of these signals, the target voltage generation unit 13 selects from a first setting voltage value Vref1 and a second setting voltage value Vref2, and outputs as an output voltage setting value Vref to the A/D conversion unit 14.

The A/D conversion unit 14 outputs, to the digital compensation unit 15, a digital output e(n) obtained by digital conversion of an error between the sample hold voltage Vsh input from the sample hold circuit 12 and the output voltage setting value Vref input from the target voltage generation unit 13.

On the basis of the digital output e(n) input from the A/D conversion unit 14, the digital compensation unit 15 performs, for example, a PI (proportion and integration) control computation represented by the following formula (1) to compute a control amount Dn(n). The computed control amount Dn(n) is output to the PWM signal generation unit 16.

$$Dn(n)=Dn(n-1)+C0*e(n)-C1*e(n-1) \quad (1)$$

Dn (n) : output of digital compensation unit in present switching cycle;

Dn(n−1): output of digital compensation unit in previous switching cycle;

e(n): digital output representing digital error in present switching cycle;

e(n−1): digital output representing digital error in previous switching cycle;

C0: computation coefficient 1 and

C1: computation coefficient 2.

The PWM signal generation unit 16 generates the PWM signal $S_{PWM}$ of a duty ratio based on a digital output input from the digital compensation unit 15 and outputs the generated PWM signal $Sp_{PWM}$ to the drive circuit 10.

Accordingly, the drive circuit 10 performs ON/OFF control of the switching element 5 in response to the PWM signal $S_{PWM}$.

Next, a specific structure of the target voltage generation unit 13 will be described with reference to FIG. 2. The target voltage generation unit 13 includes a first comparator 41 and a second comparator 42 to which the sample hold voltage Vsh is input from the sample hold circuit 12, a third comparator 43 and a fourth comparator 44 to which the digital output Dn(n) of the digital compensation unit 15 is input, and a zero determining circuit 45 to which the digital output e(n) of the A/D conversion unit 14 is input.

The sample hold voltage Vsh is input to a non-inverting input terminal of the first comparator 41, and a first threshold voltage Vsh_stb1 is input to an inverting input terminal thereof. The first comparator 41 outputs a comparison determination signal Sa1 that is at low level when Vsh<Vsh_stb1, and is at high level when Vsh≥Vsh_stb1.

A second threshold voltage Vsh_stb2 lower than the first threshold voltage Vsh_stb1 is input to a non-inverting input terminal of the second comparator 42, and the sample hold voltage Vsh is input to an inverting input terminal thereof. The second comparator 42 outputs a comparison determination signal Sa2 that is at low level when Vsh>Vsh_stb2, and that is at high level when Vsh≤Vsh_stb2.

A third threshold value Dn_stb1 as a standby state determination value is input to a non-inverting input terminal of the third comparator 43, and the digital output Dn(n) is input to an inverting input terminal thereof. The third comparator 43 outputs a comparison determination signal Sa3 that is at low level when Dn(n)>Dn_stb1, and that is at high level when Dn(n)≤Dn_stb1.

The digital output Dn (n) is input to a non-inverting input terminal of the fourth comparator 44, and a fourth threshold value Dn_stb2 as a standby state determination value is input to an inverting input terminal thereof. The fourth comparator 44 outputs a comparison determination signal Sa4 that is at high level when Dn(n)≥Dn_stb2, and that is at low level when Dn(n)<Dn_stb2.

The digital output e(n) of the A/D conversion unit 14 is input to the zero determining circuit 45, which then outputs a determination signal Sb that is at high level when the digital output e (n) is zero, and that is at low level when other than zero.

Additionally, the target voltage generation unit 13 includes a first AND circuit 46a, a second AND circuit 46b, a delay circuit 47, a counter 48, a time determining circuit 49, and a switch circuit 50.

The comparison determination signal Sa1 of the first comparator 41, the comparison determination signal Sa3 of the third comparator 43, and the determination signal Sb of the zero determining circuit 45 are input to the first AND circuit 46a. The first AND circuit 46a outputs a first AND signal Sc1 that is at high level when all of the signals Sa1, Sa3, and Sb are at high level, and that is at low level when other than that.

The comparison determination signal Sa2 of the second comparator 42, the comparison determination signal Sa4 of the fourth comparator 44, and the determination signal Se of the time determining circuit 49 are input to the second AND circuit 46b. The second AND circuit 46b outputs a second AND signal Sc2 that is at high level when all of the signals Sa2, Sa3, and Se are at high level, and that is at low level when other than that.

The PWM signal $S_{PWM}$ output from the PWM signal generation unit 16 is input to the delay circuit 47. The delay circuit 47 outputs a delay pulse signal Spd obtained by delaying the PWM signal $S_{PWM}$ by a predetermined time.

The first AND signal Sc1 output from the first AND circuit 46a is input to an IN terminal of the counter 48, the delay pulse signal Spd of the delay circuit 47 is input to a CLK terminal thereof, and the determination signal Sb of the zero determining circuit 45 is input to a negative-logic RB terminal thereof. When the first AND signal Sc1 is at high level, the counter 48 outputs, from an OUT terminal, a count value counted up every time a pulse of the delay pulse signal Sbd is input, and when the determination signal Sb is turned to low level, it stops counting and resets the count value.

A count value Sd of the counter 48 is input to the time determining circuit 49. The time determining circuit 49 outputs a determination signal Se that is at low level when the count value Sd is less than a setting value Tcnt corresponding to a previously set setting time, and that is at high level when the count value Sd reaches the setting value Tcnt.

The first setting voltage value Vref1 and the second setting voltage value Vref2 lower than the first setting voltage value Vref1 are input to an input side of the switch circuit 50. The determination signal Se of the time determining circuit 49 is input to the switch circuit 50. The switch circuit 50 selects the first setting voltage value Vref1 when the determination signal Se is at low level, and outputs as the setting voltage value Vref to the A/D conversion unit 14 from an output terminal thereof. On the other hand, the switch circuit 50 selects the second setting voltage value Vref2 when the determination signal Se is at high level, and outputs as the setting voltage value Vref to the A/D conversion unit 14 from the output terminal thereof.

In the target voltage generation unit 13, it is determined on the basis of the digital output Dn(n) of the digital compensation unit 15 whether the load 35 is in an operation state or a standby state. The target voltage generation unit 13 switches the output setting voltage value Vref that is a target value of the secondary-side output voltage Vout of the transformer 4 from the higher first setting voltage value Vref1 to the lower second setting voltage value Vref2 when a state where the digital output e (n) of the A/D conversion unit 14 is zero has continued for a predetermined time in a standby state. On the other hand, when the load 35 returns to an operation state, the target voltage generation unit 13 returns the setting voltage value Vref to the first setting voltage value Vref1.

Next, operation of the first embodiment will be described by using a timing chart depicted in FIGS. 3A to 3P.

Figure 3A:
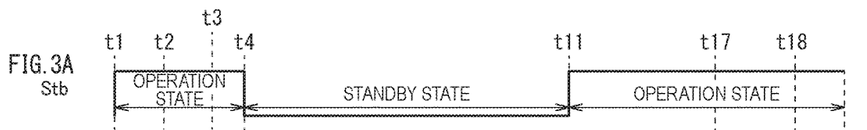
FIGS. 3A to 3P are timing charts depicting operation of the target voltage generation unit of FIG. 2.
Figures 3B, 3C:
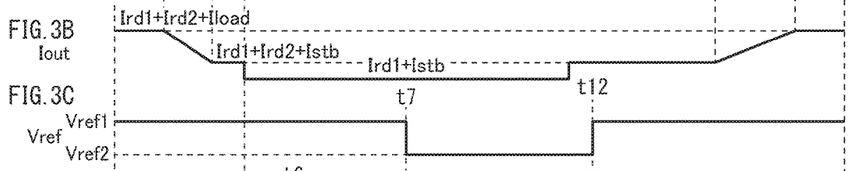

Now, in a state where at a time point t1, the load 35 is in a stable operation state and a state signal Stb output from the load 35 is at high level as depicted in FIG. 3A, a switch 37 of the in-operation discharging circuit 38 of the secondary side of the transformer 4 is in an ON state. Thereby, as depicted in FIG. 3B, the output current Iout output from the secondary side of the transformer 4 becomes a current represented by the following formula (2) obtained by adding a current Ird1 flowing through the resistor 33, a current Ird2 flowing through the resistor 36, and a load current Iload flowing to the load 35.

$$Iout=Ird1+Ird2+Iload \qquad (2)$$

Figures 3D, 3E, 3F:
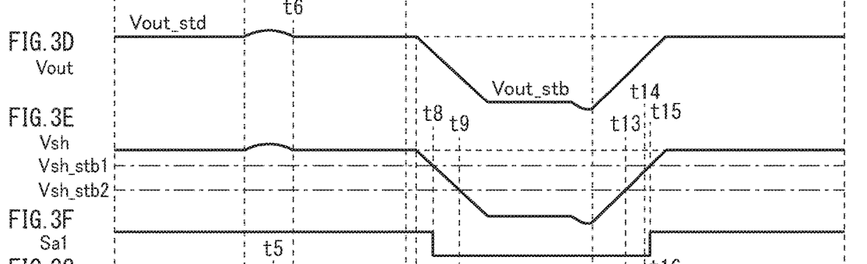

In the stable operation state of the load 35, the switching element 5 is switching-operated at a relatively high frequency, and the output voltage Vout output from the output terminal 34 is controlled to a relatively high level stable operation voltage Vout_std, as depicted in FIG. 3D.

Thereby, the output voltage detection value Vdout detected in the output voltage detection unit 24 becomes proportional to the output voltage Vout. The sample hold voltage Vsh obtained by sample-holding the output voltage detection value Vdout in the sample hold circuit 12 of the control circuit 11 also becomes a voltage higher than the first threshold value Vsh_stb1, as depicted in FIG. 3E.

Figures 3G, 3H, 3I, 3J:
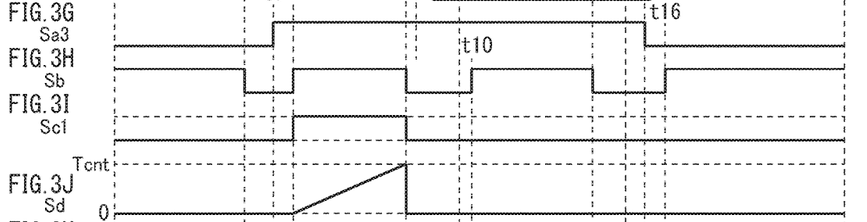
Figure 3K:
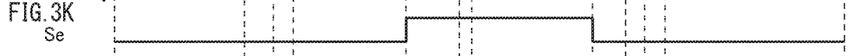
Figure 3L:
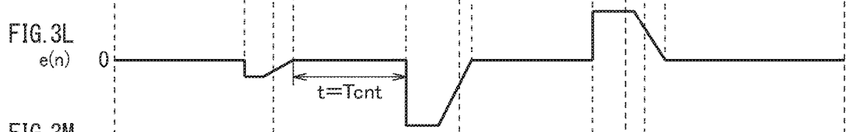
Figures 3M, 3N, 3O, 3P:
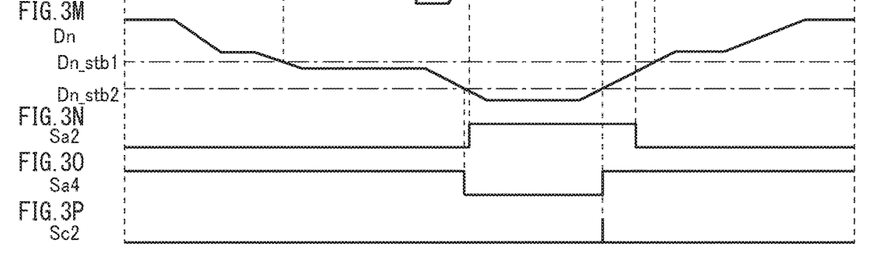

At this time, it is assumed that the setting voltage value Vref output from the target voltage generation unit 13 is the first setting voltage value Vref1 at high level corresponding to the sample hold voltage Vsh, as depicted in FIG. 3C, the digital output e(n) output from the A/D conversion unit 14 is zero, as depicted in FIG. 3L, and the digital output Dn(n) output from the digital compensation unit 15 is a higher value than the third threshold value Dn_stb1, as depicted in FIG. 3M.

In this state, the comparison determination signal Sa1 at high level is output from the first comparator 41 of the target voltage generation unit 13, as depicted in FIG. 3F. In addition, the determination signal Sb at high level is also output from the zero determining circuit 45, as depicted in FIG. 3H. Furthermore, the comparison determination signal Sa3 at low level is output from the third comparator 43, as depicted in FIG. 3G. Thus, the first AND signal Sc1 output from the first AND circuit 46a is at low level, as depicted in FIG. 3I. In addition, the count value of the counter 48 is maintained at zero, as depicted in FIG. 3J.

Accordingly, the determination signal Se of the time determining circuit 49 also is at low level, as depicted in FIG. 3K. Thus, as depicted in FIG. 3C, the switch circuit 50 selects the first setting voltage value Vref1 that is a high voltage corresponding to the sample hold voltage Vsh. The first setting voltage value Vref1 is output as the setting voltage value Vref that is the target value of the output voltage Vout to the A/D conversion unit 14.

When, as depicted in FIG. 3B, the load current Iload is reduced at a time point t2 from the stable operation state of the load 35 and goes into a standby state at a time point t3, the output current Iout becomes a low current obtained by adding the current Ird1 flowing through the resistor 33, the current Ird2 flowing through the resistor 36 and the switch 37, and the standby current Istb of the load 35, as depicted in FIG. 3B.

After that, at a time pint t4, when the load 35 switches the state signal stb for commanding the switching power supply device to perform switching to a standby state from high level to low level as depicted in FIG. 3A, the switch 37 of the in-operation discharging circuit 38 is turned OFF. Thus, the current Ird2 flowing through the resistor 36 is shut off. Additionally, the output current Iout becomes a minimum current value obtained by adding the current Ird1 flowing through the resistor 33 and the standby current Istb of the load 35, as depicted in FIG. 3B.

At the time point t4, the output voltage Vout of the output terminal 34 slightly increases, as depicted in FIG. 3D. In response to this, the sample hold voltage Vsh of the sample hold circuit 12 slightly increases, as depicted in FIG. 3E. At this time, the setting voltage value Vref output from the target voltage generation unit 13 maintains the higher first setting voltage value Vref1, as depicted in FIG. 3C. Thus, the digital output e(n) that is a difference voltage between both voltages output from the A/D conversion unit 14 becomes a value less than 0, as depicted in FIG. 3L.

Due to this, the first AND signal Sc1 of the first AND circuit 46a maintains low level, as depicted in FIG. 3I, the counter 48 maintains a reset state, and the time determining circuit 49 also maintains a reset state, whereby the switch circuit 50 maintains the state where the first setting voltage value Vref1 is selected.

After that, at a time point t5, when the digital output Dn (n) of the digital compensation unit 15 is reduced to equal to or less than the third threshold value Dn_stb1, as depicted in FIG. 3M, the comparison determination signal Sa3 of the third comparator 43 is inverted from low level to high level, as depicted in FIG. 3G. In this state, since the determination signal of the zero determining circuit 45 is maintained at low level, the first AND signal Sc1 of the first AND circuit 46a is maintained at low level, as depicted in FIG. 3I.

However, at a time point t6, when the output voltage Vout returns to the stable output voltage Vout_std, as depicted in FIG. 3D, the sample hold voltage Vsh of the sample hold circuit 12 also returns to a value before the time point t4, as depicted in FIG. 3E. Thus, the digital output e(n) of the A/D conversion unit 14 becomes zero, as depicted in FIG. 3L, and the first AND signal Sc1 of the first AND circuit 46a is inverted from low level to high level, as depicted in FIG. 3I.

The counter 48 starts counting of the delay pulse signal Spd input from the delay circuit 47, and subsequently, the count value Sd of the counter 48 is counted up. However, in the time determining circuit 49, the determination signal Se is maintained at low level, as depicted in FIG. 3K, until the count value Sd reaches the setting value Tcnt corresponding to a predetermined time. Thus, the switch circuit 50 maintains the state where the higher first setting voltage value Vref1 is selected.

After that, at a time point t7, when the count value Sd of the counter 48 reaches the setting value Tcnt of the time determining circuit 49, the determination signal Se of the time determining circuit 49 is inverted from low level to high level, as indicated in FIG. 3K. Thus, the switch circuit 50 selects the second setting voltage value Vref2 lower than the first setting voltage value Vref1, as indicated in FIG. 3C. The second setting voltage value Vref2 is output as the setting voltage value Vref to the A/D conversion unit 14.

Due to this, the digital output e (n) output from the A/D conversion unit 14 is significantly reduced to a minimum output value, as depicted in FIG. 3L. Additionally, the determination signal of the zero determining circuit 45 is turned to low level, as depicted in FIG. 3H. As a result of this, the first AND signal Sc1 of the first AND circuit 46a is inverted from high level to low level, as depicted in FIG. 3I.

Simultaneously with this, the determination signal Sb of the zero determining circuit 45 is input to the RB terminal of the counter 48, whereby the counter 48 is reset.

In this state, the output voltage Vout of the output terminal 34 of the secondary side of the transformer 4 is reduced, and in response to this, the sample hold voltage Vsh is also reduced, as depicted in FIG. 3E. On the other hand, the sample hold voltage Vsh is maintained higher than the second threshold voltage Vsh_stb2, and the comparison determination signal Sa2 of the second comparator 42 is maintained at low level, as depicted in FIG. 3N.

After that, at a time point t8, when the sample hold voltage Vsh becomes equal to or less than the first threshold voltage Vsh_stb1, as depicted in FIG. 3E, the comparison determination signal Sa1 output from the first comparator 41 is inverted from high level to low level, as depicted in FIG. 3F.

Furthermore, at a time point t9, when the sample hold voltage Vsh becomes equal to or less than the second threshold voltage Vsh_stb2, as depicted in FIG. 3E, the comparison determination signal Sa2 output from the second comparator 42 is inverted from low level to high level, as depicted in FIG. 3N. At the time point t9, the comparison determination signal Sa4 output from the fourth comparator 44 is at low level, as depicted in FIG. 3O. Thus, the second AND signal Sc2 of the second AND circuit 46b is maintained at low level, as depicted in FIG. 3P. Additionally, without resetting the time determining circuit 49, the determination signal Se is maintained at high level, and the switch circuit 50 continues the selection of the second setting voltage value Vref2.

After that, at a time point t10, the digital output e (n) of the A/D conversion unit 14 returns to zero, and the determination signal Sb of the zero determining circuit 45 returns to high level, as depicted in FIG. 3H. At this time, the comparison determination signal Sa1 of the first comparator 41 is maintained at low level, as depicted in FIG. 3F. Due to this, the first AND signal Sc1 of the first AND circuit 46a is maintained at low level, as depicted in FIG. 3I.

After that, at a time point t11, when the load 35 shifts to an operation state and the state signal stb is inverted from low level to high level as indicated in FIG. 3A, the switch 37 of the in-operation discharging circuit 38 of the secondary side of the transformer 4 returns to the ON state in response to this.

Thus, the secondary-side output current Iout of the transformer 4 is increased stepwise by an amount of the current Ird2 flowing through the resistor 36 and the switch 37, as depicted in FIG. 3B. After that, at a time point t12, the output voltage Vout of the output terminal 34 of the secondary side of the transformer 4 starts to increase, as depicted in FIG. 3D. Thus, the sample hold voltage Vsh of the sample hold circuit 12 also starts to increase, as depicted in FIG. 3E.

Thus, the digital output Dn(n) output from the digital compensation unit 15 also starts to increase, as depicted in FIG. 3M.

After that, at a time point t12, when the digital output Dn(n) output from the digital compensation unit 15 becomes equal to or more than the fourth threshold value Dn_stb2 as depicted in FIG. 3M, the comparison determination signal Sa4 of the fourth comparator 44 is inverted from low level to high level, as depicted in FIG. 3O. At the time point t12, the comparison determination signal Sa2 of the second comparator 42 is maintained at high level, as depicted in FIG. 3N. Additionally, the determination signal Se of the time determining circuit 49 is maintained at high level, as depicted in FIG. 3K. Due to this, the second AND signal Sc2 of the second AND circuit 46b is inverted from low level to high level, as depicted in FIG. 3P.

Then, the time determining circuit 49 is reset, and the determination signal Se is inverted from high level to low level, as depicted in FIG. 3K. In response to this, the switch circuit 50 selects the higher first setting voltage value Vref1 in place of the second setting voltage value Vref2, as depicted in FIG. 3C. Thus, the digital output e(n) of the A/D conversion unit 14 is increased up to a maximum output value, as depicted in FIG. 3L. In addition, the digital output Dn(n) of the digital compensation unit 15 also continues to be increased, as depicted in FIG. 3M. In response to this, the duty ratio of the PWM signal $S_{PWM}$ output from the PWM signal generation unit 16 is increased, whereby the output voltage Vout is increased, as depicted in FIG. 3D.

In addition, the second AND signal Sc2 of the second AND circuit 46b momentarily returns to low level, as depicted in FIG. 3P.

After that, at a time point t13, the sample hold voltage Vsh becomes equal to or more than the second threshold voltage Vsh_stb2, as depicted in FIG. 3E. Thus, the comparison determination signal Sa2 of the second comparator 42 returns to low level, as depicted in FIG. 3N. Subsequently, at a time point t14, the digital output Dn(n) of the digital compensation unit 15 becomes equal to or more than the third threshold value Dn_stb1, as depicted in FIG. 3M. Due to this, the comparison determination signal Sa3 of the third comparator 43 returns to low level, as depicted in FIG. 3G.

After that, when the output voltage Vout increases and the sample hold voltage Vsh becomes equal to or more than the first threshold voltage Vsh_stb at a time point t15, the comparison determination signal Sa1 of the first comparator 41 returns to high level, as depicted in FIG. 3F.

Then, at a time point t16, when the digital output e(n) of the A/D conversion unit 14 returns to zero, the determination signal Sb of the zero determining circuit 45 returns to high level, as depicted in FIG. 3H. At this time, the first AND signal Sc1 of the first AND circuit 46a is maintained at low level. Additionally, the counter 48 maintains a counting stop state. The determination signal Se of the time determining circuit 49 is also maintained at low level, as depicted in FIG. 3K. Thus, the switch circuit 50 maintains the state where the higher first setting voltage value Vref1 is selected.

After that, at a time point t17, the load current Iload is increased, thereby increasing the output current Iout. Subsequently, at a time point t18, the load current Iload becomes a maximum and returns to the state of the time point t1.

Additionally, in a case in which after going into the standby state from the operation state, the load 35 has shifted to the operation state in a state where the count value of the counter 48 has not reached the setting value Tcnt of the time determining circuit 49, the determination signal Se of the time determining circuit 49 is maintained at low level. Due to this, switching from the higher first setting voltage value Vref1 to the lower second setting voltage value Vref2 is not performed.

In this manner, according to the first embodiment, a voltage corresponding to the secondary-side output voltage Vout of the transformer 4 is divided and detected as a voltage induced on the auxiliary winding L12 of the transformer 4 by the output voltage detection unit 24. In addition, the in-operation discharging circuit 38 is provided on the secondary side of the transformer 4, whereby a discharging current path for the smoothing capacitor 32 of the secondary side of the transformer 4 is formed. When shifting to the standby state by itself, the load 35 separates the in-operation discharging circuit 38 from the smoothing capacitor 32 and brings it into a non-operation state. On the other hand, the sample hold voltage Vsh obtained by sample holding the output voltage detection value Vdout output from the output voltage detection unit 24, the digital output e (n) of the A/D conversion unit 14 that converts a difference between the sample hold voltage Vsh and the output voltage setting value Vref into a digital value, and the digital output Dn(n) of the digital compensation unit 15 that compensates the digital output e(n) are input to the target voltage generation unit 13. The target voltage generation unit 13 distinguishes between the operation state and the standby state of the load 35 and switches the output voltage setting value Vref from the higher first setting voltage to the lower second setting voltage.

Accordingly, the state of the load 35 of the transformer secondary side can be determined by an inter-terminal voltage of the auxiliary winding of the transformer and can switch the output voltage setting value Vref, without using any insulation element such as a photocoupler. Thus, there can be provided a switching power supply device that can reduce the number of components and has a simple structure.

Figure 8:
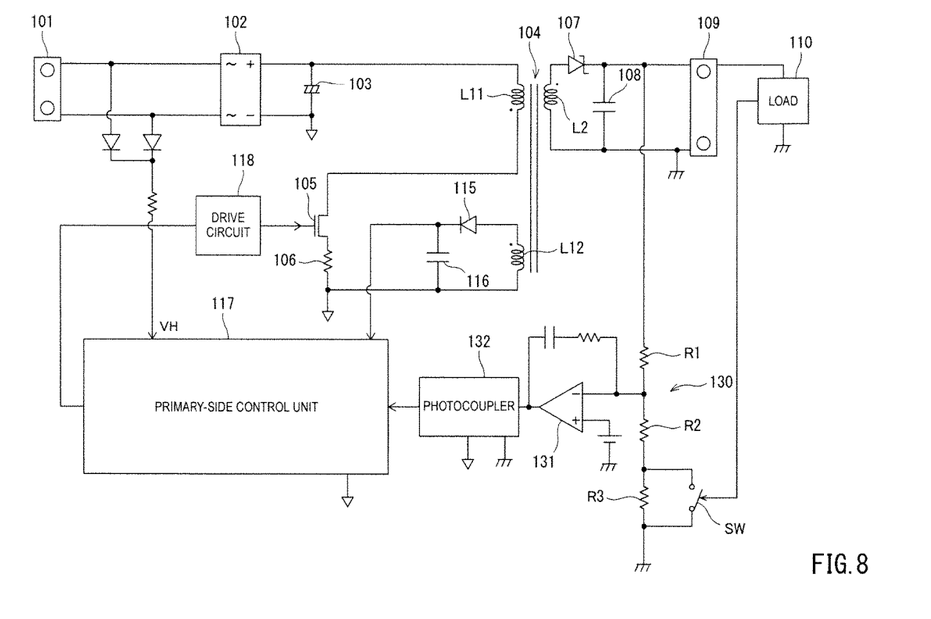
FIG. 8 is a block diagram depicting a secondary-side output voltage detection unit.
Figure 9:
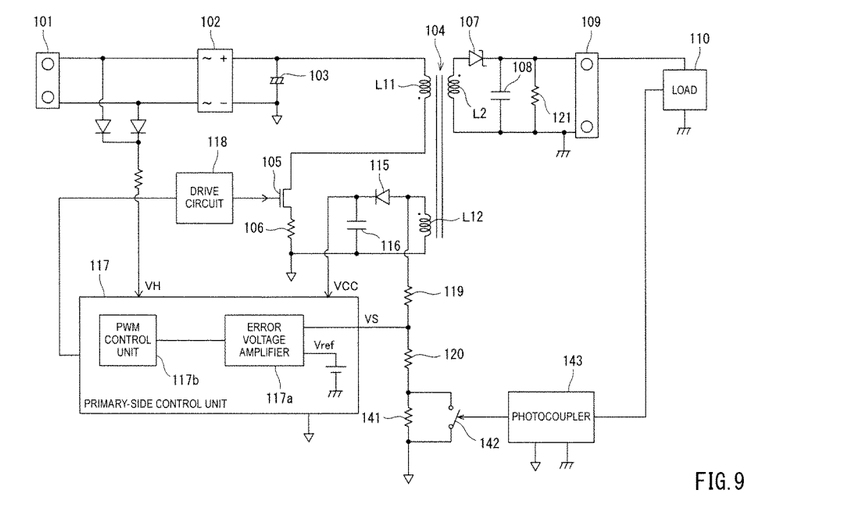
FIG. 9 is a block diagram depicting another example of the secondary-side output voltage detection unit.

Parenthetically, if the target voltage generation unit 13 that switches the output voltage setting value is not provided, a photocoupler needs to be provided in a feedback control system, as depicted in FIGS. 8 and 9, in the structure of the conventional example of FIG. 7 described above.

Specifically, the case of FIG. 8 corresponds to the switching power supply device described in JP 2011-97792 A described above. In FIG. 8, the resistor 121 of FIG. 7 is omitted, and in place of that, a voltage divider circuit 130 including voltage dividing resistors R1, R2, and R3 connected in series and a switch SW connected in parallel to the resistor R3 is provided between a positive side of the output capacitor 108 and ground. Then, an output voltage detected in the voltage divider circuit 130 is compared with a threshold voltage by a comparator 131, and a comparison determination signal of the comparator 131 is supplied to the VS terminal of the primary-side control unit 117 via a photocoupler 132.

With the structure thus provided, the output voltage Vout_std in operation mode and an output voltage Vout_stb in standby mode can be set as follows, thereby allowing for output voltage reduction in standby mode.

Vout_std=(R1/R2+1)*Vref

Vout_stb={R1/(R2+R3)+1}*Vref

In this case, an output voltage detection function by the auxiliary winding L12 cannot be provided, and the feedback control system requires the photocoupler 132. Thus, the effect of reducing the number of components cannot be exerted.

In addition, in the case of FIG. 9, a third resistor 141 is connected to a ground side of the voltage dividing resistors 119 and 120 that detect a terminal voltage of the auxiliary winding L12, a switch 142 is connected in parallel to the resistor 141, and the switch 142 needs to be driven from a load 110 via a photocoupler 143. Accordingly, even in the case of providing the output voltage detection function by the auxiliary winding L12, the photocoupler 143 as an insulation element for feedback control cannot be omitted. Thus, there is a problem in that the effect of reducing the number of components is reduced.

However, in the present embodiment, without providing any insulation element for feedback control, accurate voltage switching can be performed between an operation state and a standby state by exerting the output voltage detection function by the auxiliary winding of the transformer, so that a significant effect of reducing the number of components can be exerted.

Moreover, in the present embodiment, the target voltage generation unit 13 is formed in a simple structure obtained only by providing the four comparators 41 to 44, the zero determining circuit 45, the first AND circuit 46a, the second AND circuit 46b, the counter 48, the time determining circuit 49, and the switch circuit 50, whereby the state of the load can be detected and the output voltage setting value Vref can be switched.

Furthermore, in order to determine the standby state of the load, first, the present embodiment detects that the sample hold voltage Vsh (output voltage detection value) is equal to or more than the first threshold voltage Vsh_stb1. Then, the present embodiment detects that the digital output e(n) of the A/D conversion unit 14 obtained by digitally converting the difference between the sample hold voltage Vsh and the output voltage setting value Vref is zero, i.e., the sample hold voltage Vsh is coincident with the output voltage setting value Vref. Furthermore, the present embodiment determines that the load is in a standby state when a state where the digital output Dn(n) of the digital compensation unit 15 is detected to be equal to or less than the third threshold value Dn_stb1 has continued for a certain length of time, and reduces the output voltage setting value Vref. Due to this, in a case where the load has returned to an operation state before passage of a certain length of time after the load has shifted from the operation state to a standby state, the output voltage setting value Vref can be maintained at high level. In addition, occurrence of such an erroneous operation that carelessly reduces the output voltage setting value Vref can be prevented. Moreover, the present embodiment can accurately perform switching control of the output voltage setting value Vref without exerting any influence on the load.

Additionally, the present embodiment causes the counter 48 to count the number of pulses of the PWM signal $S_{PWM}$ that is the output of the control circuit 11. Accordingly, the present embodiment can perform determination of standby state at each switching cycle. In addition, the control circuit 11 can control so that an output voltage becomes the standby mode voltage Vout_stb lower than the rated voltage Vout_std.

Next, a second embodiment of the switching power supply device according to the present invention will be described with reference to FIGS. 4 and 5.

In the second embodiment, the digital compensation unit 15 that distinguishes between a standby state and an operation state in the first embodiment is configured to change according to not only an output current but also an input voltage. Thus, in the second embodiment, in operation conditions with high input voltage, even when the switch circuit 50 is switched in order to return to an operation state from a standby state, the digital compensation unit output does not exceed the standby determination value Dn_stb2. This can prevent an erroneous operation that cannot return the output voltage value to an operation state value.

Figure 4:
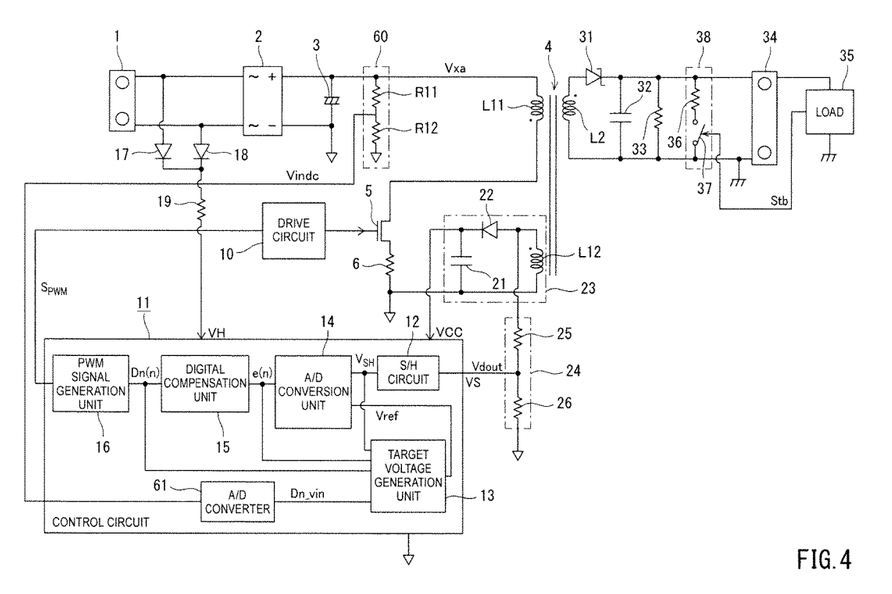
FIG. 4 is a block diagram depicting a second embodiment of the switching power supply device according to the invention.

Specifically, in the second embodiment, as depicted in FIG. 4, an input voltage detection unit 60 formed by a voltage divider circuit including two resistors R11 and R12 connected in series is connected between a connection point between a smoothing capacitor 3 and a primary winding L11 of the transformer 4 and ground. An input voltage Vindc detected in the input voltage detection unit 60 is converted into a digital value by an A/D converter 61, a digital output Dn_vin of the A/D converter 61 is input to the target voltage generation unit 13. The other structural parts are the same as those in FIG. 1. Parts corresponding to those in FIG. 1 are denoted by the same reference signs, and detailed descriptions thereof are omitted.

Figure 5:
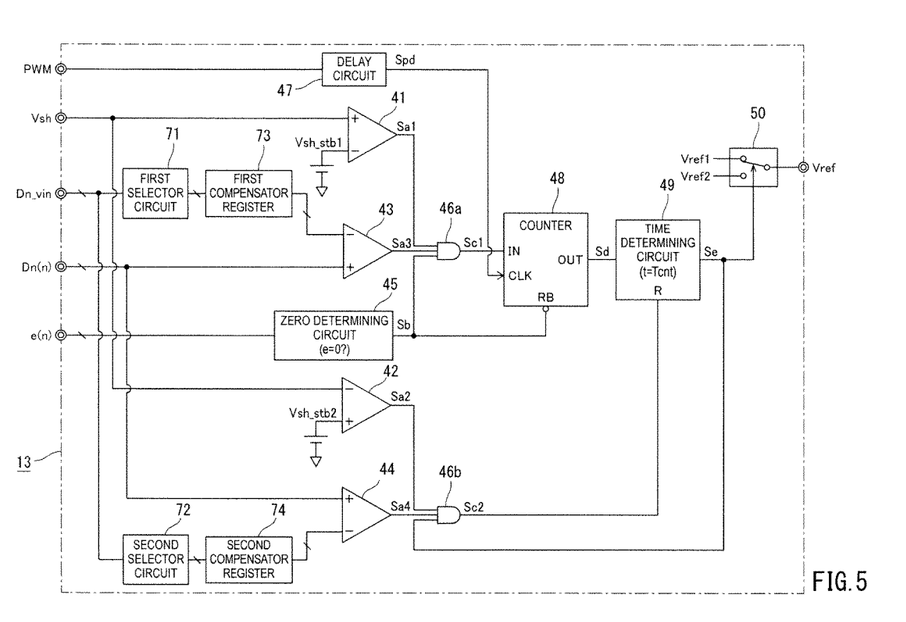
FIG. 5 is a block diagram depicting the specific structure of a target voltage generation unit of FIG. 4.

Additionally, in the target voltage generation unit 13, the digital output Dn_vin input from the A/D converter 61 is input to a first selector circuit 71 and a second selector circuit 72, as depicted in FIG. 5.

The first selector circuit 71 stores third threshold values Dn_stb11 to Dn_stb1n that are a plurality of standby determination values corresponding to a value of the input digital output Dn_vin. When the digital output Dn_vin is input, the first selector circuit 71 selects and outputs a third threshold value Dn_stb1i (i=1 to n) corresponding to the value thereof. The second selector circuit 72 stores fourth thresholds Dn_stb21 to Dn_stb2n that are a plurality of standby determination values corresponding to a value of the input digital output Dn_vin. When the digital output Dn_vin is input, the second selector circuit 72 selects and outputs a fourth threshold value Dn_stb2i (i=1 to n) corresponding to the value thereof.

The output of the first selector circuit 71 is input to a first compensator register 73 and stored as a third threshold value Dn_stb1. Additionally, the output of the second selector circuit 72 is input to a second compensator register 74 and stored as a fourth threshold value Dn_stb2.

Then, an output of the first compensator register 73 is supplied to the non-inverting input side of the third comparator 43 in the first embodiment. In addition, an output of the second compensator register 74 is supplied to the inverting input terminal of the fourth comparator 44 in the first embodiment. The other structural parts are the same as those in FIG. 2 of the first embodiment. Parts corresponding to those in FIG. 2 are denoted by the same reference signs, and detailed descriptions thereof are omitted.

According to the second embodiment, an input direct current voltage Vin input to the primary winding L11 of the transformer 4 is detected by the input voltage detection unit 60. The input voltage detection voltage Vindc output from the connection between the resistors R11 and R12 is converted into a digital signal Dn_vin by the A/D converter 61 and input to the target voltage generation unit 13.

In the target voltage generation unit 13, the digital output Dn_vin corresponding to the input direct current voltage Vin input is input to the first selector circuit 71 and the second selector circuit 72. Thus, the first and second selector circuits 71 and 72 select a third threshold value Dn_stb1i and a fourth threshold value Dn_stb2i that are optimum standby determination values corresponding to the value of the input direct current voltage Vin. The target voltage generation unit 13 stores the selected third and fourth threshold values Dn_stb1i and Dn_stb2i in the first and second compensator registers 73 and 74, and supplies the stored third and fourth threshold values Dn_stb1i and Dn_stb2i, as a third threshold value Dn_stb1 and a fourth threshold value Dn_stb2 respectively, to the third comparator 43 and the fourth comparator 44.

Thus, the third threshold value Dn_stb1 and the fourth threshold value Dn_stb2 input as reference values to the third comparator 43 and the fourth comparator 44 are selected as optimum values according to the input direct current voltage Vin. As a result of this, in operation conditions with high input direct current voltage Vin, the load returns from standby state to operation state. Accordingly, when the switch 37 of the in-operation discharging circuit 38 of the transformer secondary side is switched to the ON state, the digital output Dn (n) of the digital compensation unit 15 does not exceed the fourth threshold value Dn_stb2 that is a standby determination value. Thus, the present embodiment can surely prevent an erroneous operation in which the output voltage Vout does not return to the first setting voltage value Vref1 in operation state.

Next, a third embodiment of the switching power supply device according to the present invention will be described with reference to FIG. 6.

In the third embodiment, the in-operation discharging circuit 38 provided in parallel to the discharging resistor 33 of the transformer secondary side in the second embodiment is omitted, and in place of that, an in-operation discharging circuit is provided inside the load.

Figure 6:
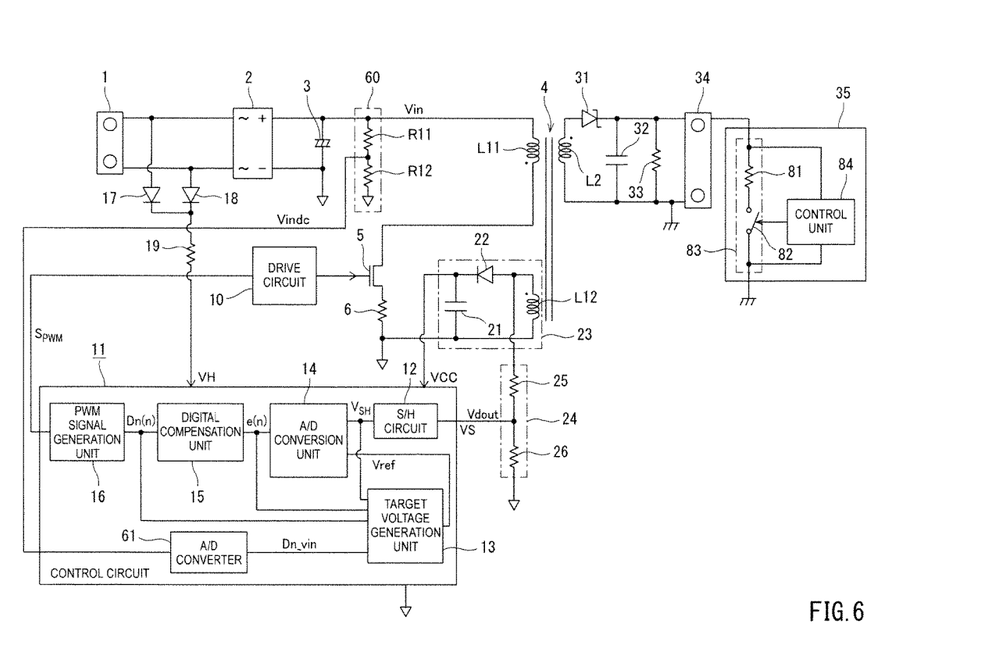
FIG. 6 is a block diagram depicting a third embodiment of the switching power supply device according to the invention.

Specifically, in the third embodiment, as depicted in FIG. 6, the in-operation discharging circuit 38 connected between the discharging resistor 33 and the output terminal 34 in the structure of the second embodiment described above is omitted. Then, as an alternative to the in-operation discharging circuit 38, inside the load 35 is provided an in-operation discharging circuit 83 formed by a series circuit of a resistor 81 connected between a positive side of the output terminal 34 and ground and a switch 82. The switch 82 of the in-operation discharging circuit 83 is configured to be turned ON in operation mode and turned OFF in standby mode by a control unit 84 such as a CPU provided inside the load 35. The other structural parts are the same as those in the second embodiment described above. Parts corresponding to those in the second embodiment are denoted by the same reference signs, and detailed descriptions thereof are omitted.

According to the third embodiment, the in-operation discharging circuit 83 is provided inside the load 35, and the switch 82 of the in-operation discharging circuit 83 is controlled so as to be turned ON in operation mode and turned OFF in standby mode. Thus, the third embodiment can form, as the discharging current Ird2 in operation mode with respect to the output current Iout, a current Ird2 that flows through the resistor 81 and the switch 82 inside the load 35, so that the same operational advantageous effects as the second embodiment described above can be obtained. Moreover, the third embodiment can reduce wires for the state signal std between the transformer secondary side and the load 35, and therefore can exert a more significant effect of reducing the number of components.

In addition, the above third embodiment has described the case where the installation position of the in-operation discharging circuit in the second embodiment is changed. However, the installation position of the in-operation discharging circuit in the above first embodiment may be changed.

Additionally, the first to third embodiments have described the case where the drive circuit 10 driving the switching element 5 has been disposed outside the control circuit 11. However, the embodiments are not limited thereto, and the drive circuit 10 may be arranged inside the control circuit 11.

Figure 2:
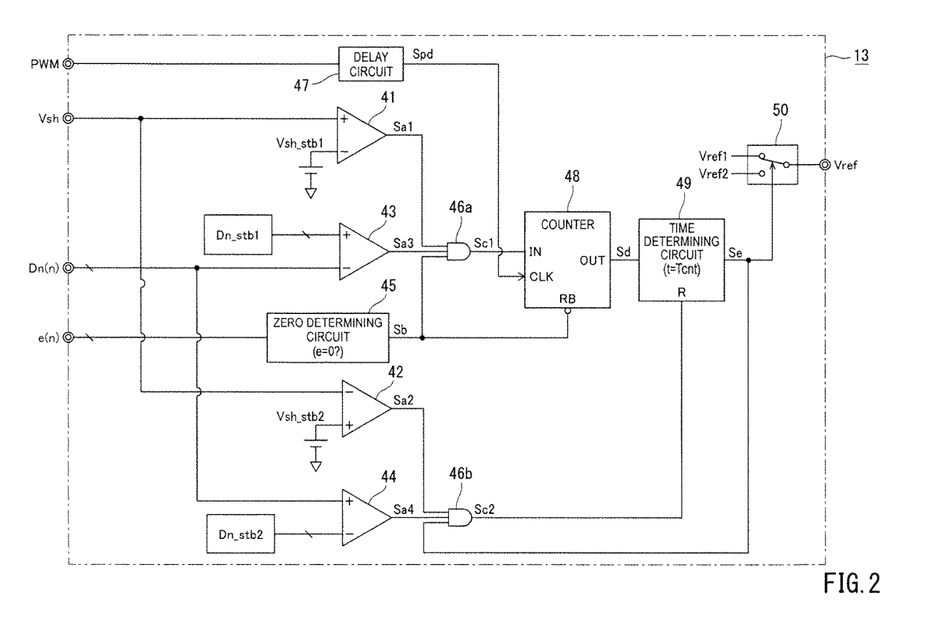
FIG. 2 is a block diagram depicting the specific structure of a target voltage generation unit of FIG. 1.

Additionally, the structure of the target voltage generation unit 13 is not limited to the structure of FIG. 2 or FIG. 5. The output of the sample hold circuit 12 may be converted into a digital signal by an A/D converter and input to an arithmetic processing unit such as a microcomputer, and the arithmetic processing unit may execute a program describing control processing corresponding to the target voltage generation unit 13, the A/D conversion unit 14, the digital compensation unit 15, and the PWM signal generation unit 16.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Input terminal
2 AC-DC conversion circuit
3 Smoothing capacitor
4 Fly-back transformer
L11 Primary winding
L12 Auxiliary winding
L2 Secondary winding
5 Switching element
10 Drive circuit
11 Control circuit
12 Sample hold circuit
13 Target voltage generation unit
14 A/D conversion unit
15 Digital compensation unit
16 PWM signal generation unit
23 Power supply circuit
24 Output voltage detection unit
31 Rectifier diode
32 Smoothing capacitor 33 Discharging resistor
34 Output terminal
35 Load
38 In-operation discharging circuit
41 First comparator
42 Second comparator
43 Third comparator
44 Fourth comparator
45 Zero determining circuit
46a First AND circuit
46b Second AND circuit
47 Delay circuit
48 Counter
49 Time determining circuit
50 Switch circuit
60 Input voltage detection unit
71 First selector circuit
72 Second selector circuit
73 First compensator register
74 Second compensator register
83 In-operation discharging circuit
84 Control unit

The invention claimed is:

1. A switching power supply device including a switching element connected to a primary winding of a transformer to which direct current power is supplied, a control circuit that performs switching-control of the switching element, and a load that is connected to a secondary side of the transformer and to which an output voltage is supplied via a rectifier circuit, the switching power supply device comprising:
an output voltage detection unit that detects the output voltage and outputs an output voltage detection value, wherein the control circuit comprises:
a target voltage generation unit that generates an output voltage setting value for setting the output voltage that is supplied to the load;
an A/D conversion unit that converts an error between the output voltage setting value and the output voltage detection value into a digital signal and outputs the digital signal;
a digital compensation unit that computes an amount of control based on an output signal of the A/D conversion unit; and
a PWM signal generation unit that generates a PWM signal for the switching element based on an output signal of the digital compensation unit and outputs the PWM signal, and
the target voltage generation unit detects a standby state based on the output voltage detection value, the output signal of the A/D conversion unit, and the output signal of the digital compensation unit, and, when detecting the standby state, switches the output voltage setting value to a second setting voltage value lower than a first setting voltage value for a state other than the standby state.

2. The switching power supply device according to claim 1, wherein the control circuit is arranged on a primary side of the transformer from which an operation power supply is supplied, and wherein the output voltage detection unit includes an auxiliary winding of the transformer and detects the output voltage from a voltage across the auxiliary winding.

3. The switching power supply device according to claim 2, wherein the output voltage detection unit includes a voltage divider circuit connected between one end of the auxiliary winding and ground, and outputs a divided voltage of the voltage divider circuit as the output voltage detection value.

4. The switching power supply device according to claim 1, wherein the target voltage generation unit comprises:
a first comparator and a second comparator that respectively compare the output voltage detection value input from the output voltage detection unit with a first threshed value and a second threshold value, respectively, that are different from each other;
a third comparator and a fourth comparator that respectively compare the output signal of the digital compensation unit with a third threshold value and a fourth threshold value, respectively, that are different from each other;
a voltage determining circuit that determines that the output voltage detection value is equal to the output voltage setting value;
a counter that counts the PWM signal based on comparison results of the first comparator and the third comparator and a determination result of the voltage determining circuit;
a time determining circuit that determines a duration time based on a count value of the counter; and
a selector circuit that selects from the first setting voltage value and the second setting voltage value based on a determination result of the time determining circuit.

5. The switching power supply device according to claim 4, wherein the counter starts the counting of the PWM signal by an AND signal of output signals of the first comparator, the third comparator, and the voltage determining circuit, and stops the counting of the PWM signal by an AND signal of output signals of the second comparator, the fourth comparator, and the time determining circuit.

6. The switching power supply device according to claim 4, wherein the counter starts the counting of the PWM signal when the first comparator determines that the output voltage detection value is equal to or more than the first threshold value, the third comparator determines that the output signal of the digital compensation unit is equal to or less than the third threshold value, and the voltage determining circuit determines that the output voltage detection value is equal to the output voltage setting value, and stops the counting of the PWM signal when the voltage determining circuit determines that the output voltage detection value is different from the output voltage setting value.

7. The switching power supply device according to claim 4, wherein the time determining circuit outputs a first switching signal for switching from the first setting voltage value to the second setting voltage value when the count value of the counter reaches a value corresponding to a setting time, and outputs a second switching signal for switching from the second setting voltage value to the first setting voltage value when the second comparator determines that the output voltage detection value is equal to or less than the second threshold value, the fourth comparator determines that the output signal of the digital compensation unit is equal to or more than the fourth threshold value, and the time determining circuit is outputting the first switching signal.

8. The switching power supply device according to claim 4, wherein the third comparator and the fourth comparator respectively include a first compensator register and a second compensator register to which the third threshold value and the fourth threshold value are set, respectively.

9. The switching power supply device according to claim 7, wherein the control circuit comprises an input voltage detection unit that detects a direct current input voltage of a primary winding side of the transformer, and changes the values of the first compensator register and the second compensator register based on the direct current input voltage detected in the input voltage detection unit.

\* \* \* \* \*

UNITED STATES PATENT AND TRADEMARK OFFICE
CERTIFICATE OF CORRECTION

PATENT NO. : 9,755,527 B2  
APPLICATION NO. : 15/274641  
DATED : September 5, 2017  
INVENTOR(S) : Tetsuya Kawashima Page 1 of 1

It is certified that error appears in the above-identified patent and that said Letters Patent is hereby corrected as shown below:

In the Claims

Column 18, Line 9:
In Claim 4, delete "threshed" and insert -- threshold --, therefore.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*